United States Patent [19]

Tobias

[11] Patent Number: 5,050,835
[45] Date of Patent: Sep. 24, 1991

[54] ACTIVE ACCUMULATOR VIBRATION ABSORBING SUPPORT SYSTEM

[76] Inventor: Jaromir Tobias, 322 E. 57th St., New York, N.Y. 10022

[21] Appl. No.: 414,254

[22] Filed: Sep. 29, 1989

[51] Int. Cl.$^5$ ............................................ F16M 13/00
[52] U.S. Cl. .................................. 248/550; 248/638; 248/649; 267/64.11
[58] Field of Search ............... 248/550, 638, 649, 562, 248/618, 631, 636; 123/192 R; 267/64.11, 218

[56] References Cited

U.S. PATENT DOCUMENTS

| | | |
|---|---|---|
| 900,342 | 10/1908 | Ashley . |
| 1,216,761 | 2/1917 | York . |
| 2,100,404 | 11/1937 | Mason et al. . |
| 2,239,612 | 4/1941 | Lawlor . |
| 2,240,011 | 4/1941 | Casey . |
| 2,396,653 | 3/1946 | Hormanny . |
| 2,727,470 | 12/1955 | Ludwig . |
| 3,157,202 | 11/1964 | Sadler et al. . |
| 3,281,101 | 10/1966 | May ...................................... 248/550 |
| 3,343,560 | 9/1967 | Nankivell . |
| 3,459,395 | 8/1969 | Scotto ................................... 248/562 |
| 3,669,150 | 6/1972 | Everett . |
| 3,690,607 | 9/1972 | Mard ..................................... 248/550 |
| 3,784,146 | 1/1974 | Matthews ............................. 248/562 |
| 3,957,128 | 5/1976 | Le Salver et al. . |
| 4,553,744 | 11/1985 | Konishi et al. . |
| 4,735,296 | 4/1988 | Pinson . |
| 4,762,306 | 8/1988 | Watanabe ............................. 248/631 |
| 4,788,949 | 12/1988 | Best ...................................... 123/192 R |
| 4,858,898 | 8/1989 | Niikura ................................. 267/218 |

Primary Examiner—Ramon O. Ramirez
Assistant Examiner—Robert A. Olson
Attorney, Agent, or Firm—Antonelli, Terry, Stout & Kraus

[57] ABSTRACT

A vibration isolation support mounting system for supporting a vibrating load (1) with respect to a relatively fixed support (2) comprises at least one load support vibration isolation mount (3) including a first mount part (3A) securable to the vibrating load, a second mount part (3B) securable to the relatively fixed support, guide structure for guiding relative movement of the first and second mount parts, a first spring cushion arrangement (42) and a high a pressure fluid medium arrangement are disposed in series between the first and second mount parts to attenuate vibration induced force transfer between the first and second mount parts. High pressure fluid lines (4, 45) continuously communicate the load support mount with a main hydraulic fluid accumulator (5). A pump (6) maintains the hydraulic fluid pressure in the accumulator.

28 Claims, 4 Drawing Sheets

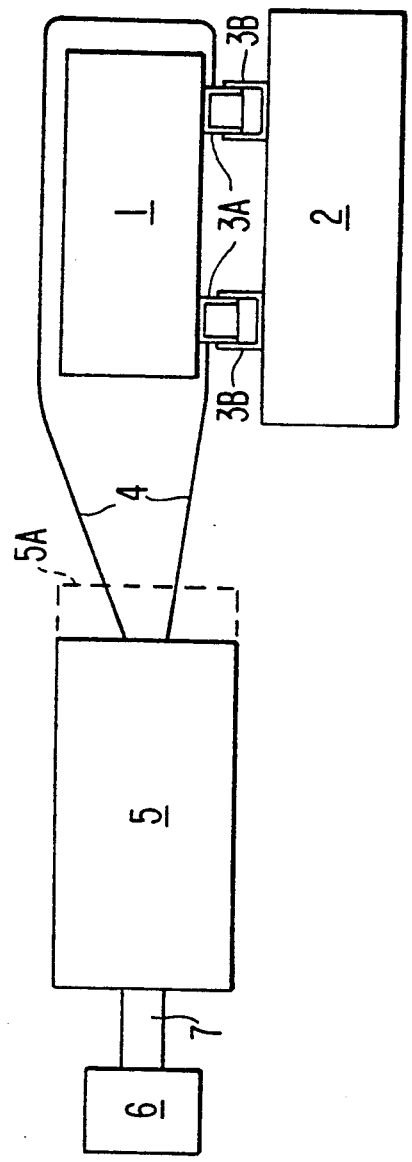
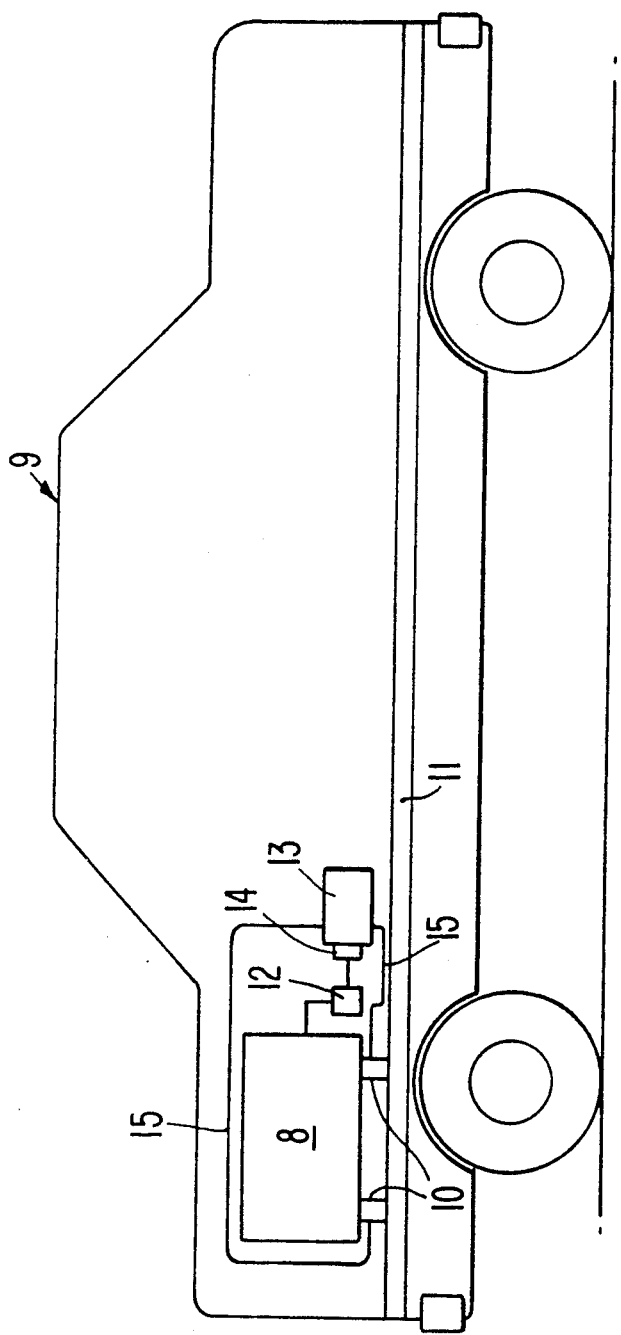

ELECTRIC OUTPUT

ACTIVE ACCUMULATOR VIBRATION ABSORBING SUPPORT SYSTEM

BACKGROUND AND SUMMARY OF THE INVENTION

The present invention relates to a vibration absorbing system for absorbing mechanical vibrations, such as reciprocating engine induced mechanical vibration. There are many commercial and industrial environments where engines or other vibration inducing mechanisms are supported at relatively fixed structure with some type of vibration damping system interposed between the support structure and the vibrating mechanism. For example, internal combustion engine driven vehicles are provided with shock absorbing engine mounts which are intended to limit the transmission of engine vibrations into the vehicle body frame and vice versa.

Certain prior art vehicle engine mounts comprise elastically deformable hard rubber cushions or the like for cushioning the transfer of vibrations between the engine and the vehicle frame. Such solid elastically deformable engine mounts do help isolate the vehicle body frame carrying the engine from engine induced mechanical vibrations and the engine from vehicle induced vibrations. However, such engine mounts suffer from disadvantages in that they are unable to attentuate the wide range of mechanical vibrations experienced in use on an automobile. For example, an automobile is designed to operate under many speed, torque, acceleration and deceleration conditions, all of which create different mechanical vibration force, frequency and amplitude patterns. The above-mentioned conventional shock absorber type engine mounts are preset and passive in that they only passively react to vibration forces based on their preset elastic design characteristics. Such vibration isolation mounts can be designed to operate quite well over certain narrow mechanical vibration patterns. However, it is impractical, if not impossible, to design effective preset passive isolation vibration mounts which can attenuate vibrations over all operating ranges of the engine and vehicle.

Certain other prior art vehicle engine mounts utilize a closed fluid shock absorber system for cushioning the transfer of vibrations between the engine and the vehicle frame. Since these fluid shock absorber mounts are closed systems, the same act much like the elastically deformable spring or hard rubber cushion mounts discussed above. Further, in cases of large relative movement between the parts being supported, the shock attenuation substantially diminishes as the fluid pressure rises. Although certain shock absorber mounts provide for multiple fluid chambers and different flow paths depending upon the relative displacement of the parts being supported, such systems are very complex and costly to construct and are also ultimately limited by the total volume of fluid and fluid accommodating space in the overall closed system at an individual shock absorber mount.

The above-mentioned prior art arrangements thus permit an unacceptable level of transfer of vibration forces between the engine and the vehicle frame, and/or involve very complicated, expensive and space wasting constructions.

The internal combustion engine driven automotive vehicle mechanical vibration problems discussed above are but one example of complex mechanical vibration problems that occur. Another example is a drive assembly support for the rotor blades of a helicopter. Such helicopter rotor blade drive assemblies further compound the mechanical vibrations that should be attenuated. Prior attempts to attenuate vibrating force transfers between helicopter blade drive assemblies and the helicopter body or helicopter passenger compartment meet with similar difficulties as described for the motor vehicles driving on the ground, due again to the wide spectrum of vibration force, frequency and amplitude which are experienced during the helicopter operation. Mechanical vibration isolation problems also occur in stationary engine environments such as driving engines for heating and air conditioning units mounted on commercial buildings or stationary engine electrical generators used at construction sites and at remote areas where electric power must be generated. In these installations, it is desired to minimize mechanical vibration force transfers between the engine and pumps or generators driven by same so as to minimize noise and minimize vibration induced mechanical failures.

An exemplary environment where reduction of mechanical vibration transfer is especially desired involves so-called top floor "penthouse" spaces of large commercial buildings with rooftop heating, venting and air conditioning systems (HVAC systems). Due to vibration induced sound and actual vibration movement of the floors and walls caused by the rooftop HVAC systems, top floors of such buildings are not desirable prime office or living spaces. Again, prior attempts to passively mount the large generators, pumps, etc. for such HVAC systems can only imperfectly and inefficiently respond to the induced mechanical vibration and especially to changes in the vibration spectrum occurring during operations.

The present invention is directed at providing a simple, economical, effective mechanical vibration absorbing system which can respond to a wide range of induced vibration forces, frequencies and amplitudes. The present invention is further directed at overcoming the above-noted problems with prior art arrangements.

These objects are achieved according to the present invention by providing an "active" vibration absorbing system which utilizes a relatively large main fluid pressure accumulator which is actively continuously maintained at a predetermined fluid pressure by a fluid pumping system, and one or more vibration absorber mounts interposed between relatively fixed support structure and the motor or other device inducing the mechanical vibrations, these vibration absorber mounts being continuously acted on by fluid pressure from the main accumulator. The vibration absorber mounts which are constantly in communication with the predetermined pressure of the main accumulator source are effective as responsive vibration absorbers which automatically accommodate for changes in the vibration force, amplitude, and frequency over a wide range.

Due to the relatively small volume of the individual vibration absorber mounts as compared to the main accumulator, restoring pressure fluid supply to the individual mounts is applied in a rapid and reliable manner. In especially preferred embodiments, the hydraulic fluid accommodating volume of the main accumulator is substantially greater than the total volume of all of the individual vibration absorbing mounts connected thereto. In certain preferred embodiments the volume in the main accumulator is more than 10 times the volume of each of the respective vibration absorber mounts connected thereto, including the high pressure connecting lines.

In preferred embodiments of the invention, the main accumulator and pump supplying same are designed so as to provide sufficient fluid pressure and volume response at the individual vibration absorber mounts supplied thereby to handle the predetermined maximum expected vibration induced displacements of the entire system.

In especially preferred embodiments of the invention, the vibration absorber mounts interposed between the relatively fixed support structure and the engine or other vibration inducing mechanism are constructed as individual shock absorbing accumulators having a gas or other spring cushion acting in series with the pressure being supplied via the main accumulator. For example, with a passenger car vehicle engine mounting system, there would be supplied a pump, a main accumulator which is maintained at a constant pressure by the pump, and pressure lines leading from the main accumulator to the individual accumulators at the vibration absorber mounts, preferably distributed symmetrically with respect to the vehicle engine load.

According to certain preferred embodiments, individual vibration absorber support accumulators that are supplied by the main accumulator are constructed as piston and cylinder shock absorber mechanisms which have a fluid pressure space continuously in communication with the main accumulator. In especially preferred embodiments, the fixed and movable parts at the individual vibration support absorber accumulators are constructed as plates which are then in turn mounted to the respective vibration inducing moving part and the relatively fixed part supporting same.

In preferred embodiments of the invention the fluid pressure lines leading from the main accumulator to the individual vibration absorber support accumulators are one-way lines which "deadend" at the individual mounts. Thus, the system is quite simple and economical to construct, while still providing a continuously active support system which adapts to changes in the load "seen" or experienced at the individual mounts over a wide range of vibration displacements.

In especially preferred embodiments for automotive engine mounts, the individual vibration absorber accumulators are constructed to be supported in longitudinal body frame members of the vehicle body This construction advantageously utilizes existing space on the vehicle body.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic diagram showing an active accumulator vibration absorbing support system constructed in accordance with preferred embodiments of the invention;

FIG. 2 is a schematic view depicting the active accumulator vibration absorbing support system applied to a motor vehicle engine mounting system, in accordance with a preferred embodiment of the invention;

DETAILED DESCRIPTION OF THE DRAWINGS

Figure 3:
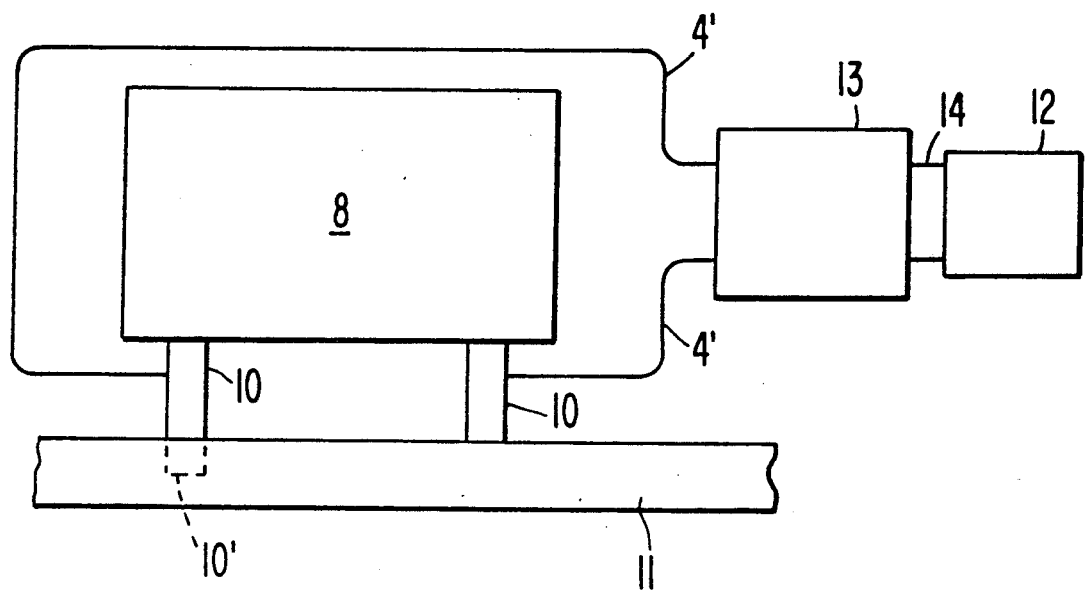
FIG. 3 is a schematic enlarged lateral view of the motor vehicle engine mounting system of FIG. 2.

FIG. 1 schematically depicts an active accumulator vibration isolation support system constructed according to a preferred embodiment of the present invention. A vibrating load 1, such as a vehicle engine or the like, is to be supported at a fixed support 2, such as a vehicle frame or the like, by means of vibration attenuating support mounts 3. Each of the support mounts 3 is continuously communicated with a high pressure line 4, in turn supplied by a constant high pressure from a main accumulator 5. A pump 6 and valve assembly 7 are provided for maintaining the main accumulator 5 continuously at a predetermined constant pressure. The individual supports 3 include a first part 3A attached to move with the vibrating load 1 and a second part 3B attached to the fixed support 2, these parts 3A and 3B being movable with respect to one another against fluid pressure supplied via the high pressure lines 4. As described in more detail below with respect to the exemplary embodiments, the vibration mounts also include a gas cushion, spring cushion, or the like, in series connection with the high pressure fluid from lines 4.

The system schematically depicted in FIG. 1 operates as follows. The pump 6 and main accumulator 5 continuously maintain a constant high pressure for the pressure lines 4 leading to the individual support mounts. Since the fluid pressure in lines 4 is connected directly in series with the vibrating load support, any relative vibration movements will be immediately sensed and transmitted by the hydraulic fluid pressure in lines 4. The main accumulator assures a quick response to pressure changes in lines 4 over a very wide range of relative vibration movements between parts 3A and 3B. The system is continuously "active" in that the large main accumulator is continuously maintained at a constant predetermined pressure to thereby effectively provide an effective extremely large volume for the pressure lines 4.

In especially preferred embodiments, a spring cushion in the form of a gas cushion is connected in series with the high pressure fluid in lines 4 at each of the individual support mounts 3. This combination of the gas cushion and the high pressure fluid maintained by the main accumulator, provides for attenuation of the force transfer between the vibrating load and the high pressure fluid and the restoration adjustment of the pressure in the lines 4. The lines 4 preferably deadend into the support mounts 3, without return lines, as they need only function to maintain the high volume, high pressure availability of the main accumulator to respond to the changes in the vibrating load. FIG. 1 also includes a schematic depiction, in dash lines, of a valve manifold 5A, which can be provided for control valves to control the flow of pressure fluid between the main accumulator and the respective pressure lines 4. These valves in manifold 5A are controllable as a function of the experienced pressure in the lines 4 and/or of the vibrating load displacement, to thereby provide an active attenuation of the vibration movements.

FIG. 2 schematically depicts a preferred embodiment of the invention used to mount an engine 8 in a vehicle 9. The engine 8 is to be supported by the vibration isolation mounts 10 constructed according to the invention, at longitudinal vehicle frame members 11. In FIG. 2, the pump 12 and main accumulator 13 are connected so as to be operationally maintained by the driving of the engine 8. That is, the engine will, via a belt drive or the like connected to the crank shaft, operate to continuously drive the pump 12. The control valve assembly 14 is to be controlled to supply a constant pressure in the main accumulator 13. The high pressure lines 15 from the main accumulator to the individual vibration mount supports 10 can be quite small diameter tubing that can be readily accommodated in the engine compartment. As discussed below with respect to FIGS. 3 and 4, the individual mounting supports 10 are integrated into the vehicle frame structure so as to minimize space requirements.

Figure 4:
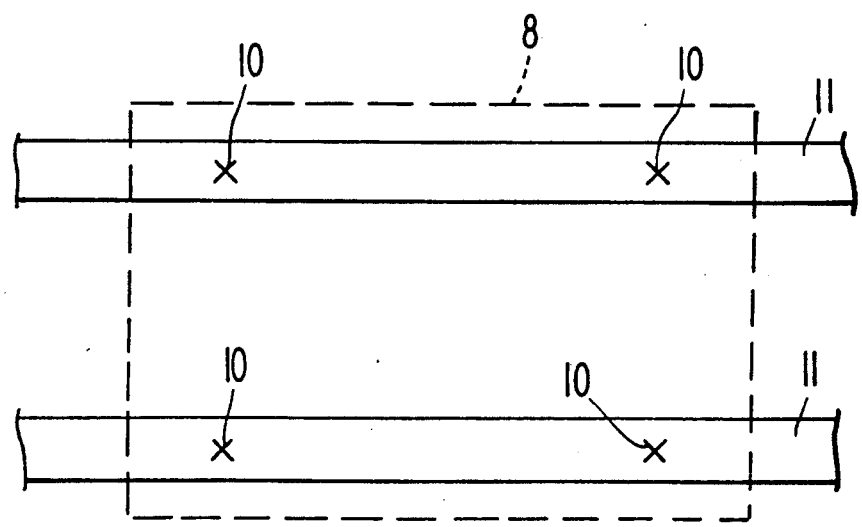
FIG. 4 is a schematic plan view depicting the location of the engine mounts of FIGS. 2 and 3 at the vehicle frame.

FIGS. 3 and 4 schematically depict the location of the vibration support mounts 10 at fixed frame members 11 of the vehicle. The individual supports 10 include lower parts 10' shown in dash lines in FIG. 3, which are encapsulated within the contours of the fixed frame members 11, which are usually constructed as U-shaped or of other open space configuration which provides mounting spaces that can be utilized.

Figure 5:
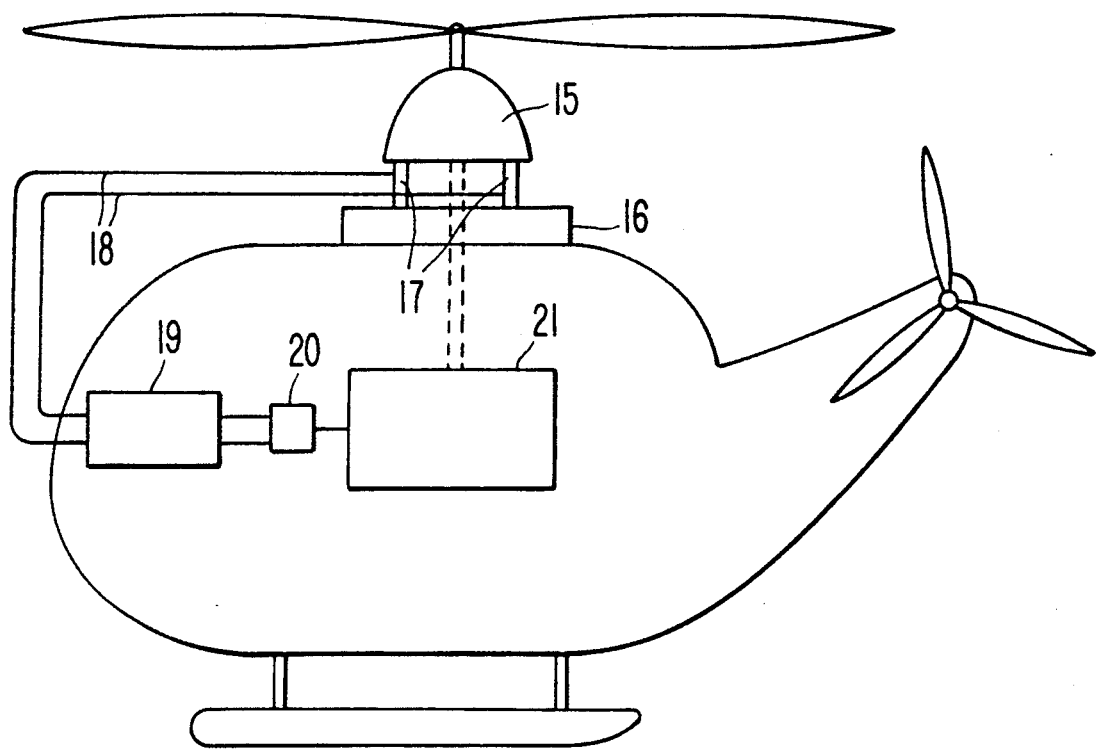
FIG. 5 is a schematic view depicting an active accumulator vibration absorbing support system applied to a mounting system for a helicopter blade drive assembly, constructed in accordance with a preferred embodiment of the invention.

FIG. 5 schematically depicts application of the support system for a helicopter blade drive assembly. The helicopter blade drive assembly 15 is supported at the helicopter body frame 16 by means of a plurality of vibration supports 17 connected via high pressure lines 18 to a main accumulator 19 supplied by a pump 20 driven by the helicopter engine 21.

Figure 6:
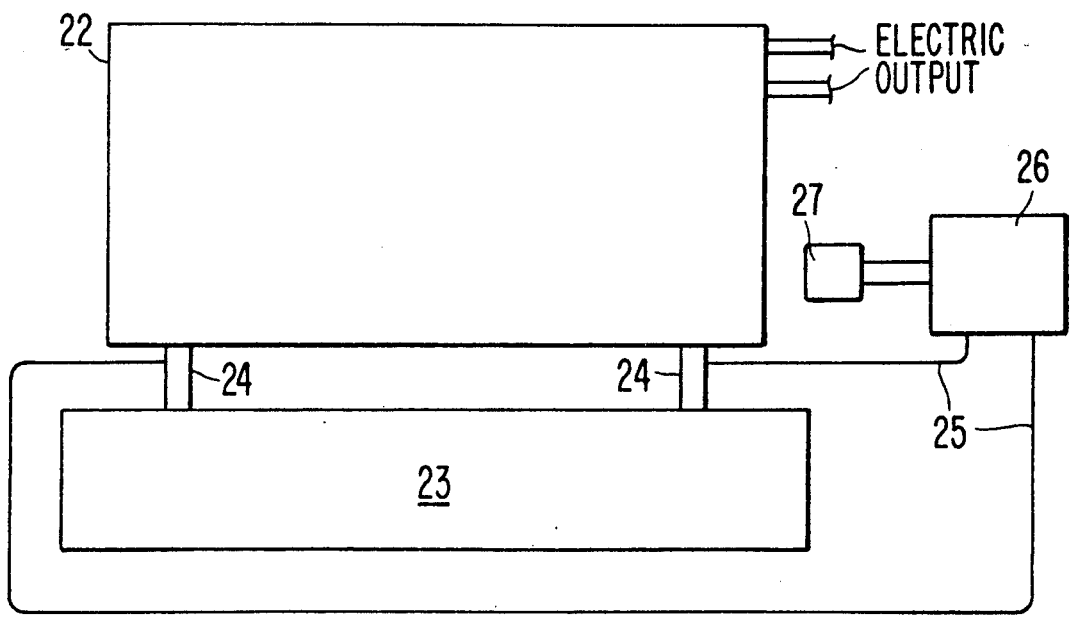
FIG. 6 is a schematic view depicting an active accumulator vibration absorbing support system applied to a mounting system for a large mega generator station assembly, constructed in accordance with a preferred embodiment of the invention.

FIG. 6 schematically depicts an embodiment of the invention in use in supporting a large mega generator 22 at a fixed ground support 23. The support system includes a plurality of vibration isolation support mounts 24 which are each in turn connected by high pressure lines 25 to a high pressure accumulator 26 supplied by pump 27.

Figure 7:
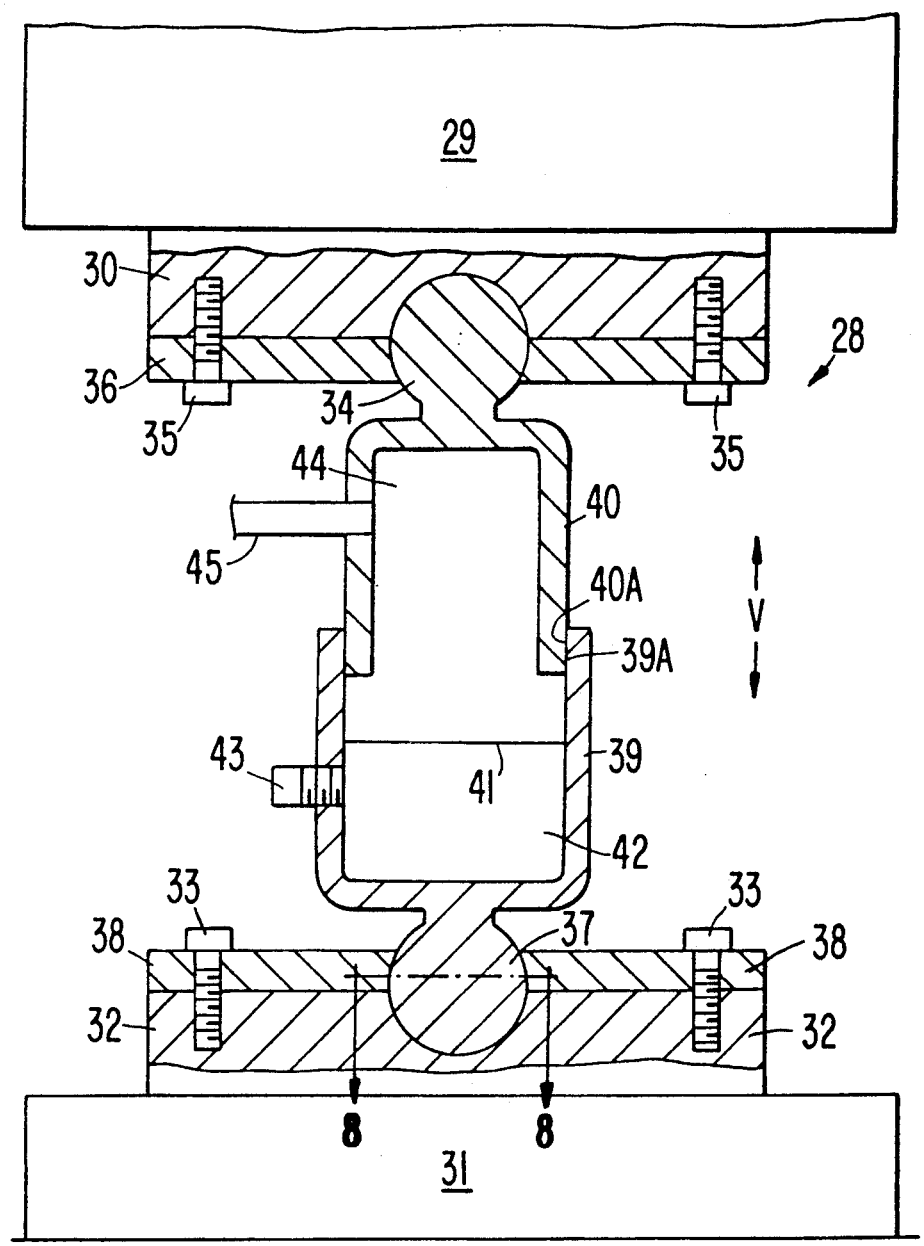
FIG. 7 is a schematic sectional view showing an individual vibration support mount constructed according to a preferred embodiment of the present invention.
Figure 8:
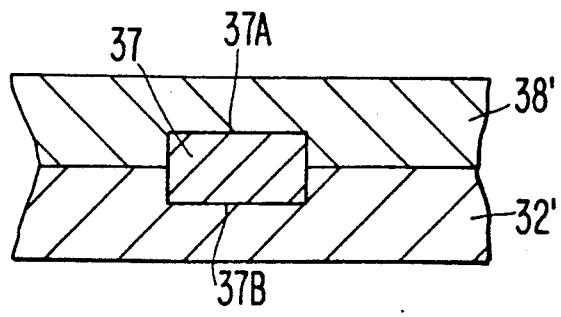
FIG. 8 is a schematic sectional view showing a detail of FIG. 7 taken along line 8—8.

FIG. 7 schematically depicts a preferred embodiment of a single support mount 28 which can be used as one of the respective mounts 3, 10, etc. generally described with respect to the installation arrangements above. The vibrating part 29, such as a vehicle engine, generator unit, or helicopter blade drive assembly is provided with a first mounting plate 30 fixed at the underside thereof. A second mounting plate 32 is detachably fixable by way of threaded bolts 33 to the relatively fixed support structure 31, such as the vehicle frame. A spherical joint member 34 is connected via bolts 35 and connecting plate 36 with the plate 30 so as to permit universal pivoting movement of the part 34 within the socket defined by the plates 30 and 36. In a similiar manner, a second spherical joint member 37 is detachably attached by the bolts 33 and attaching plate 38 with the mounting plate 32. Due to the spherical ball joint connection by way of members 34 and 37, relative pivotal movements are permitted thereof with bearing guidance over the surface of the spherical ball joints. FIG. 8 schematically depicts an alternative embodiment wherein spherical member 37 is cut away to form parallel guide surfaces 37A and 37B which ar guided in corresponding guide surfaces at the mounting plates 32, 38 so as to permit relative pivotal movement about one axis, while preventing pivotal movement about any other axis. This guided control of the relative pivotal movement can be advantageously applied in certain preferred embodiments of vehicle engine mounts to limit engine movements in the direction of its crankshaft axis.

Other preferred embodiments are contemplated wherein different shaped joint connections are provided at the mounting plates so as to control the variable degrees of movement between the joint members 34, 37 and respective engine 29 and frame 31, which are connected by the mounting support 28.

The lower ball member 37 is fixedly attached to a lower cylinder part 39, which opens upwardly to accommodate a second cylindrical part 40 attached to the ball member 34. The cylinder parts 39 and 40 include inter-engaging sliding surfaces 39A and 40A which guide relative axial movement of the parts 39 and 40 with respect to one another in response to vibration induced relative movement of the mass 29 being supported and the fixed frame support 31. A diaphram 41 is provided in the cylinder part 39 for closing off a gas filled space 42. Gas is supplied to the space 42 by a removable closing plug 43, which can be provided with a safety valve. An upper space 44 in the cylinder part 40 is filled with pressurized hydraulic fluid which is in constant communication with a pressure line 45. The pressure line 45 is in turn in constant communication with a main accumulator, such as the accumulator 5 described above with respect to FIG. 1, the accumulator 13 described above with respect to FIG. 2 and the accumulator for the helicopter embodiment.

In operation of the mount 28 shown in FIG. 7, the vibrating movements depicted by the double arrow "V" of the part 29 are transmitted to the fixed support part 31 with a vibration attenuation and restoring force being exerted by the series connected gas chamber 42 and fluid pressure chamber 44 acting on the cylinder parts 39, 40. The ball joint connections 34, 37 permit desired relative pivotal movement in addition to the axial movement "V". The supply of pressure from the main accumulator via line 45 to the individual accumulator fluid space 42 assures that the individual support mount effectively sees an almost infinite volume of fluid pressure. Since a constant pressure source is supplied by the line 45, changes in the load at the part 29 are easily accommodated as appropriate restoring force will be provided via the line 45. The cylinder parts 39, 40 are provided with appropriate limit stops so that the unit does not come apart in response to substantial changes in the load otherwise tending to separate the cylinder parts 39, 40.

The preferred embodiments described above for the individual support mount 10 with respect to FIG. 7 included a slideable piston cylinder connection permitting universal pivotal relative movement at the joint connection of the vibrating load and the fixed support structure. As noted above with respect to FIG. 8, the present invention contemplates various types of connections that would permit other types of relative movement.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A vibration isolation support mounting system for supporting a vibrating load with respect to a relatively fixed support, comprising:
   at least one load support vibration isolation mount including a first mount part securable to a vibrating load, a second mount part securable to a relatively fixed support, guide means for guiding relative movement of the first and second mount parts, first spring cushion means and high pressure fluid medium means disposed in series between the first and second mount parts to attenuate vibration induced force transfer between said first and second mount parts,
   main hydraulic fluid accumulator means,
   pump means for maintaining a predetermined pressure of hydraulic of fluid in the main accumulator means,
   and high pressure fluid line means continuously communicating the main accumulator pressure with the high pressure fluid medium means at the at least one load support mount.

2. A system according to claim 1, wherein said first spring cushion means is a gas cushion.

3. A system according to claim 1, wherein said first spring cushion means is a mechanical spring.

4. A system according to claim 1, wherein said guide means include means for permitting universal pivotal movement of the vibrating load with respect to the fixed support.

5. A system according to claim 4, wherein said guide means includes spherical bolt connection means for the at least one of the first and second mount parts.

6. A system according to claim 1, wherein said guide means includes slideably interengageable cylinder walls attached to the respective first and second mount parts, said cylinder walls enclosing a pressure space for the high pressure fluid medium means.

7. A system according to claim 6, wherein the main accumulator means has a volume which is substantially greater than the volume of the pressure space enclosed by the cylinder walls.

8. A system according to claim 7, wherein the main accumulator means has a volume which is more than 10 times the volume of the pressure space enclosed by the cylinder walls at a respective single vibration isolation mount.

9. A system according to claim 6, wherein a plurality of said load support vibration isolation mounts are provided which are disposed at spaced apart locations between the vibrating load and the relatively fixed support.

10. A system according to claim 9, wherein respective separate high pressure fluid line means interconnect the main accumulator means with the respective pressure spaces of the support vibration mounts.

11. A system according to claim 9, wherein the combined fluid accommodating volume of the pressure spaces at said support vibration mounts and the high pressure fluid line means is substantially smaller than the volume of the main accumulator means.

12. A system according to claim 11, wherein respective separate high pressure fluid line means interconnect the main accumulator means with the respective pressure spaces of the support vibration mounts.

13. A system according to claim 12, wherein at least four support vibration mounts are provided.

14. In combination, a vibrating load, a support and a vibration isolation support mounting system supporting the vibrating load with respect to the support, said mounting system comprising:
   at least one load support vibration isolation mount including a first mount part secured to the vibrating load, a second mount part secured to the support, guide means for guiding relative movement of the first and second mount parts, first spring cushion means and high pressure fluid medium means disposed in series between the first and second mount parts to attenuate vibration induced force transfer between said first and second mount parts,
   main hydraulic fluid accumulator means,
   pump means for maintaining a predetermined pressure of hydraulic fluid in the main accumulator means,
   and high pressure fluid line means continuously communicating the main accumulator pressure with the high pressure fluid medium means at the at least one load support mount.

15. The combination according to claim 14, wherein said vibrating load is an internal combustion engine of a vehicle and said relatively fixed support is a vehicle body frame member.

16. The combination according to claim 14, wherein said vibrating load is a helicopter blade drive assembly and the support is a helicopter frame body member.

17. The combination according to claim 14, wherein said first spring cushion means is a gas cushion.

18. The combination according to claim 14, wherein said guide means include means for permitting universal pivotal movement of the vibrating load with respect to the support.

19. The combination according to claim 18, wherein said guide means includes spherical bolt connection means for the at least one of the first and second mount parts.

20. The combination according to claim 14, wherein said first spring cushion means is a mechanical spring.

21. The combination according to claim 19, wherein the main accumulator means has a volume which is substantially greater than the volume of the pressure space enclosed by the cylinder walls.

22. The combination according to claim 21, wherein the main accumulator means has a volume which is more than 10 times the volume of the pressure space enclosed by the cylinder walls at a respective single vibration isolation mount.

23. The combination according to claim 14, wherein said guide means includes slideably interengagable cylinder walls attached to the respective first and second mount parts, said cylinder walls enclosing a pressure space for the high pressure fluid medium means.

24. The combination according to claim 23, wherein a plurality of said load support vibration isolation mounts are provided which are disposed at spaced apart locations between the vibrating load and the support.

25. The combination according to claim 24, wherein respective separate high pressure fluid line means interconnect the main accumulator means with the respective pressure spaces of the support vibration mounts.

26. The combination according to claim 24, wherein the combined fluid accommodating volume of the pressure spaces at said support vibration mounts and the high pressure fluid line means is substantially smaller than the volume of the main accumulator means.

27. The combination according to claim 26, wherein respective separate high pressure fluid line means interconnect the main accumulator means with the respective pressure spaces of the support vibration mounts.

28. The combination according to claim 27, wherein at least four support vibration mounts are provided.

* * * * *